United States Patent [19]

Morishita

[11] 4,309,647
[45] Jan. 5, 1982

[54] COMMUTATORLESS MOTOR DEVICE

[75] Inventor: Takashi Morishita, Tokyo, Japan

[73] Assignee: Tokyo Shibaura Denki Kabushiki Kaisha, Kawasaki, Japan

[21] Appl. No.: 15,237

[22] Filed: Feb. 26, 1979

[30] Foreign Application Priority Data

Feb. 27, 1978 [JP] Japan ................................. 53/20856

[51] Int. Cl.³ ........................ H02P 7/42; H02P 5/40; H02P 7/62
[52] U.S. Cl. .................................. 318/721; 318/722; 318/803; 318/805
[58] Field of Search ............... 318/720, 721, 722, 723, 318/798, 799, 800, 801, 802, 803, 805

[56] References Cited

U.S. PATENT DOCUMENTS

| 3,887,853 | 6/1975 | Klein et al. | 318/801 |
| 3,894,277 | 7/1975 | Tachibana et al. | 318/721 X |
| 4,051,419 | 9/1977 | Takahashi | 318/721 |
| 4,074,174 | 2/1978 | Kuge | 318/799 X |
| 4,160,940 | 7/1979 | Wolf | 318/805 X |

FOREIGN PATENT DOCUMENTS

| 1563265 | 3/1970 | Fed. Rep. of Germany | 318/721 |
| 2703541 | 7/1978 | Fed. Rep. of Germany | 318/803 |
| 45-41545 | 12/1970 | Japan | 318/721 |
| 46-35089 | 10/1971 | Japan | 318/800 |
| 46-39012 | 11/1971 | Japan | 318/721 |
| 50-125220 | 10/1975 | Japan | |
| 50-77902 | 1/1977 | Japan | 318/799 |
| 52-29917 | 3/1977 | Japan | |

OTHER PUBLICATIONS

"During Characteristics of the Commutatorless Motor . . .", S. Tadakuma et al., Transactions of I.E.E. of Japan, vol. 98, No. 1 (SH053-1).

Primary Examiner—J. V. Truhe
Assistant Examiner—Richard M. Moose
Attorney, Agent, or Firm—Oblon, Fisher, Spivak, McClelland & Maier

[57] ABSTRACT

In a commutatorless motor device including a synchronous motor driven through a frequency converter including gate-controlled electric valves, and a device for detecting the phase voltages of the synchronous motor, a device for dividing the detected phase voltages by a signal corresponding to the speed of the synchronous motor. The outputs of the dividing device are fed to a logic signal converter which converts them into signals corresponding to the position of the rotating magnetic field of the synchronous motor. The outputs of the logic signal converter are passed through a logic circuit and a gate-pulse generating circuit for generating gate pulses for controlling the electric valves of the frequency converter.

3 Claims, 3 Drawing Figures

COMMUTATORLESS MOTOR DEVICE

BACKGROUND OF THE INVENTION

1. Field of the Invention

This invention relates generally to a commutatorless motor device, and more particularly to a type thereof wherein induced voltages of a synchronous motor are utilized for detecting the rotor position, and the motor is thereby operated at a predetermined margin angle regardless of variation in stator current.

2. Description of the Prior Art

A commutatorless motor device is known wherein the angular position of the rotating magnetic field is detected by a proximity switch or the like, and the commutation of the stator current is controlled by the thus detected position indicative signal. This type of commutatorless motor device, however, cannot compensate for the shifting of the rotating magnetic field due to the armature reaction, and the power factor and operational efficiency of the device are deteriorated during the light-load condition, thereby increasing the torque ripple.

Recently, there has been developed a control system of commutatorless motors, wherein the position of the rotating magnetic field is detected directly from the counter electromotive force of the motor, and the stator current is commutated under the control of the thus detected positional signal so as to compensate for any harmful effect of the armature reaction.

In this case, however, since the amptitude of the counter electromotive force changes according to the magnitude of rotational velocity of the rotor, the induced voltage detected during rotation of the motor at low velocity can be very small and to detect exactly the counter electromotive force is difficult. Accordingly, it has been impossible to sufficiently improve the output characteristic of the motor.

Further the margin angle of commutation for the control system for the commutatorless motor is varied by the load condition of the motor, thus deteriorating the output characteristics of the motor, particularly in its light-load condition.

SUMMARY OF THE INVENTION

A primary object of the present invention is to provide a commutatorless motor device which can be operated at a constant margin angle of commutation regardless of the load condition of the commutatorless motor.

According to the present invention, these and other objects can be accomplished by the provision of a commutatorless motor device which comprises a synchronous motor driven through a frequency converter including controlled semiconductor switching elements, means for detecting the phase voltage of the synchronous motor, detecting means for detecting the speed of the synchronous motor, a wave forming circuit for forming the waveform of the detected phase voltage by applying the output of the speed detecting means, a logic circuit for producing logic signals from the output of the wave forming circuit, and gate-pulse generating means responsive to said logic signals for producing signals for controlling the controlled semiconductor elements. The foregoing as well as other objects, features and advantages of the present invention will become more apparent from the following detailed description taken in conjunction with the appended drawings.

DESCRIPTION OF THE PREFERRED EMBODIMENT

Figure 1:
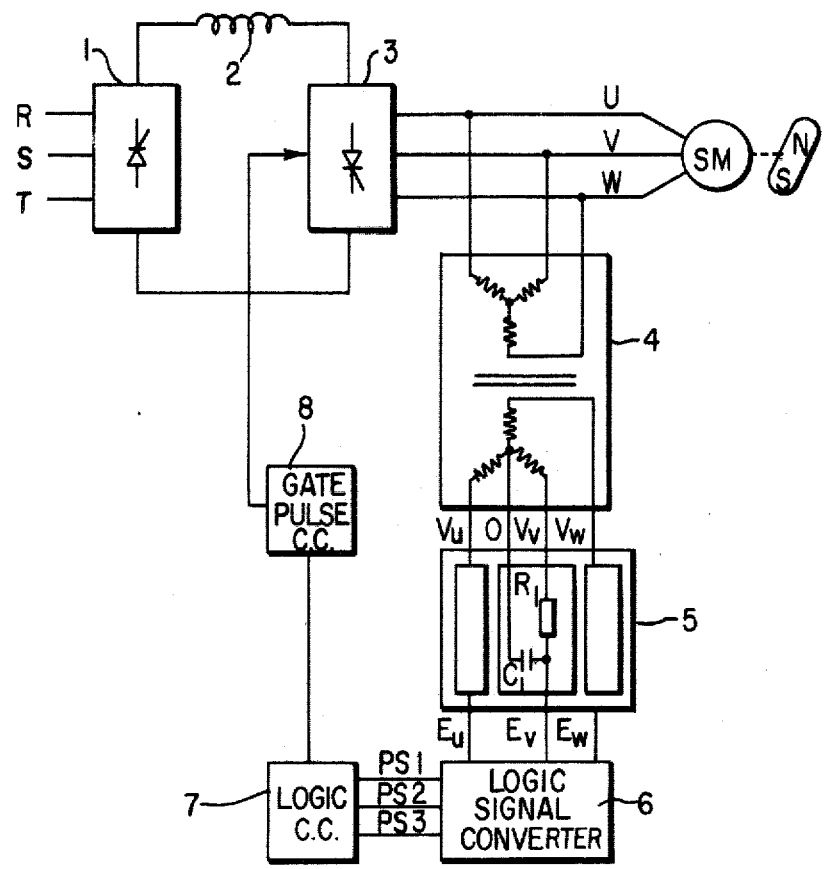
FIG. 1 is a block diagram showing a conventional commutatorless motor device.

Referring now to the drawings, wherein like reference numerals and characters designate identical or corresponding parts, for a better understanding of the present invention, the aforementioned conventional control system of commutatorless motor utilizing the induced phase voltage thereof as a position detecting signal of the rotating magnetic field will now be described with reference to FIG. 1.

In FIG. 1 showing a block diagram of the conventional control system of a commutatorless motor, R, S, and T designate three phase a.c. power lines, respectively, which are connected to a phase-controlled thyristor-type rectifying device 1, the d.c. output of which is connected through a smoothing reactor 2 to a phase-controlled thyristor inverter device 3. The rectifier device 1 and inverter device 3 constitute a frequency converter. A commutatorless motor generally designated by SM is a synchronous motor with a rotor having magnetic poles NS and a stator having stator windings, the input terminals of which are designated by U, V, and W.

When the synchronous motor SM constructed as a commutatorless motor is operated, the phase voltages thereof are picked up by a transformer 4 to provide phase-voltages representing signals Vu, Vv and Vw with respect to the neutral point. These signals are then passed through a filter 5 having a resistor $R_1$ and a condensor $C_1$ for removing ripples or the like for obtaining fundamental waveforms Eu, Ev, and Ew of the phase voltages.

Reference numeral 6 designates a converter having three polarity detectors (not shown) wherein the polarities of the thus obtained fundamental sinusoidal waves of the phase voltages Eu, Ev and Ew are detected to deliver logic signals PS1, PS2, and PS3 indicative of the positions of the magnetic fluxes of the rotating magnetic poles of the synchronous motor SM. The position detecting logic signals PS1, PS2, and PS3 are thereafter sent to a logic circuit 7 to be processed therein, and the output signals therefrom are sent to a pulse generating circuit 8 which in turn delivers gating pulses to operate the thyristors of the inverter 3.

Because of the operational principle of the commutatorless motor, the gating pulses constituting commutation instructions for the thyristors of the inverter 3 should have a predetermined phase relation (termed a commutating advance angle) with the corresponding one of the phase voltages of the commutatorless motor SM. Since the position detecting signals PS1, PS2, and PS3 are obtained from the phase voltages of the motor, the aforementioned phase relation is of course satisfied.

Since the commutation angle when operating at no load is smaller than the commutation angle when operating with load added, the commutation margin angle at the full load is greater than the commutation margin angle at no-load, which indicates that the commutation margin angle in the conventional control system of the commutatorless motor is increased during the no-load condition or a light-load condition of the commutatorless motor, whereby the power factor and the output characteristics of the motor are deteriorated as the motor is operated in these conditions.

The above described disadvantage of the conventional control system of the commutatorless motor can be eliminated by a commutatorless motor device according to the present invention, which will now be described with reference to FIGS. 2 and 3.

Figure 2:
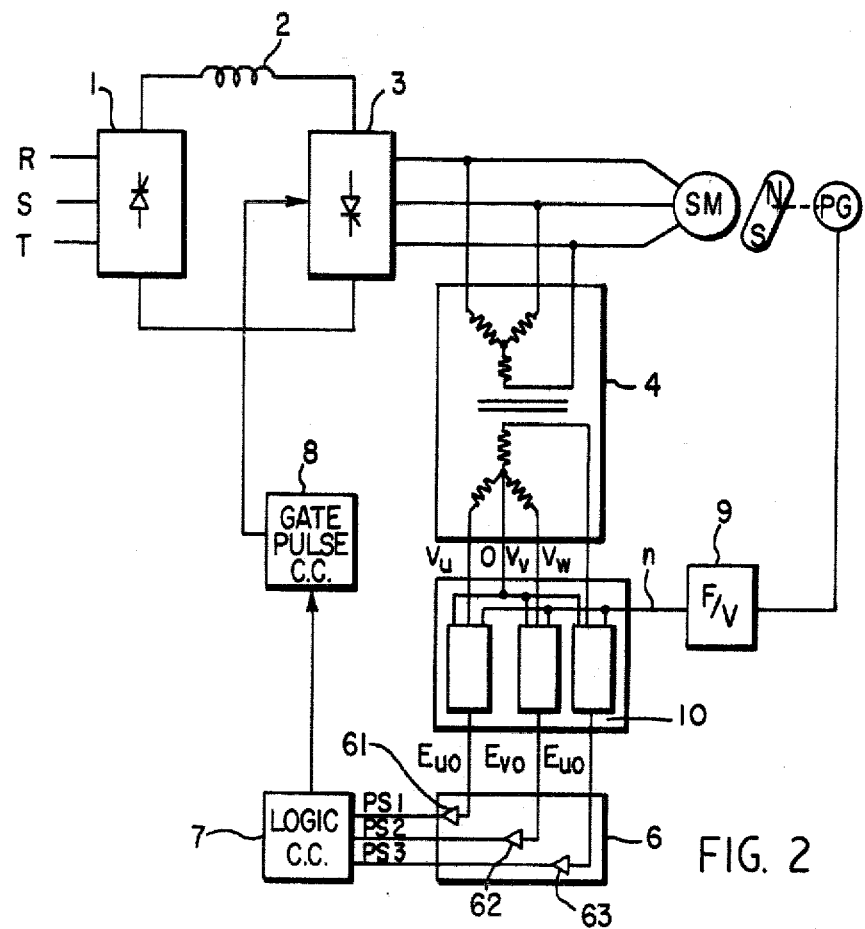
FIG. 2 is a block diagram showing an embodiment of the present invention.

A commutatorless motor device constituting a preferred embodiment of the present invention is illustrated in FIG. 2, wherein parts corresponding to those shown in FIG. 1 are designated by the same reference characters, and repeated description of these parts are omitted for the simplification of the description.

As shown in FIG. 2 there are provided a pulse generator PG connected to the rotor of the synchronous motor for generating pulses at a frequency propoerional to the speed of the rotor, a frequency/voltage converter 9 wherein the output of the pulse generator PG is converted to a voltage amplitude in order to obtain a speed signal, and a wave forming circuit 10 for forming the electromotive waveform of the force of the synchronous motor.

Figure 3:
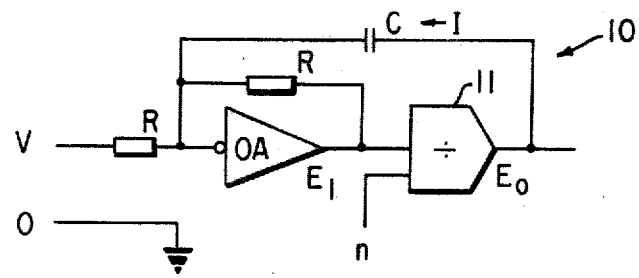
FIG. 3 is a circuit diagram showing the wave forming circuit shown in FIG. 2.

Detailed construction of the wave forming circuit 10 which is essential to this invention is illustrated in FIG. 3.

In the wave forming circuit 10 shown in FIG. 3, the electromotive force V is supplied to an operational amplifier OA through an input resistor R, and the output $E_1$ of the operational amplifier OA is supplied to one input terminal of a divider 11.

A part of the output $E_0$ of the divider 11 is added to the input of the operational amplifier OA through a condenser C as shown in the arrow with symbol I. A resistor R which is the same value as the input resistor is connected between input and output terminals of the operational amplifier OA as a feedback resistor.

The speed signal n obtained from the pulse generator PG is added to another input terminal of the divider 11.

Assuming that a phase electromotive force is designated by V, whose amplitude is determined from $E \cdot n$ where n is the maximum rotation speed of the motor (E is constant), the angular frequency is designated by w, and the time is designated by t, as well-known, one obtains the equation $V = E \cdot n \cdot \sin wt$.

In this case the output voltage $E_0$ corresponding to the input voltage of the operational amplifier OA is obtained from the following related equations.

$$V/R + I = E_1/R \quad (1)$$

$$E_1/n = E_0 \quad (2)$$

$$1/c \int I dt = E_0 \quad (3)$$

$$V = E \cdot n \cdot \sin wt \quad (4)$$

After equations (1) to (4) are transformed by Laplace conversion, the Laplace symbol $L(E_0)$ is obtained as follows;

$$L(E_0) = -\frac{E \cdot n \cdot w}{CR} \cdot \left(\frac{1}{S^2 + w^2}\right) \cdot \left(\frac{1}{S - \frac{n}{CR}}\right) \quad (5)$$

By reversing the equation (5) in Laplace conversion, the output voltage $E_0$ of the divider 11 becomes as follows;

$$E_0 = \frac{E \cdot n \cdot w}{CR} \cdot \frac{1}{w^2 + \left(\frac{n}{CR}\right)^2} \quad (6)$$

$$\left(\cos wt + \frac{n}{wCR} \cdot \sin wt - e^{-\frac{n}{CR}t}\right)$$

Assuming the stable state i.e. $t = \infty$ (endlessly), the output voltage $E_0$ is obtained as follows.

$$E_0 = \frac{E \cdot n \cdot w}{CR} \cdot \frac{1}{w^2 + \left(\frac{n}{CR}\right)^2} \left(\cos wt + \frac{n}{CR} \sin wt\right) \quad (7)$$

$$= \frac{E \cdot n}{CR} \cdot \frac{1}{\sqrt{w^2 + \left(\frac{n}{CR}\right)^2}} \sin(wt + \theta) \quad (8)$$

where $\theta = \tan^{-1}\frac{w}{\left(\frac{n}{CR}\right)}$

Since the speed n of the motor corresponds to the angular frequency w, by replacing n with $a \cdot w$, i.e. $n = a \cdot w$ (a is constant), one obtains the following equation:

$$E_0 = \frac{E \cdot a}{CR} \cdot \frac{1}{\sqrt{1 + \left(\frac{a}{CR}\right)^2}} \sin(wt + 0) \quad (9)$$

$$= k \cdot \sin(wt + \theta) \quad (10)$$

where $k = \frac{E \cdot a}{CR} \cdot \frac{1}{\sqrt{1 + \left(\frac{a}{CR}\right)^2}}$ : constant $\theta = \tan^{-1}\frac{CR}{a}$ : constant It should be noted that the output voltage $E_0$ is constant regardless of the amplitude of the input voltage V only, but the phase lag angle is a constant regardless of the value of the input frequency at irrelevant.

In FIG. 2, the electromotive force Vu, Vv and Vw detected by the transformer 4 is acted upon as to make the amplitude of the output waveform of the electromotive force $Eu_0$, $Ev_0$ and $Ew_0$ constant regardless of the speed n of the motor.

Furthermore, the phase lag introduced by the filter is constant.

Next selected pairs of $Eu_0$, $Ev_0$ and $Ew_0$ are summed vectorially and a sinusoidal wave having the predetermined phase difference between the electromotive force and the phase voltage is made, or after the values of the resistor R and capacitor C are selected and the phase difference of the output waveform is adjusted, the polarity of the output waveform is converted by the logic signal converter 6 having three polarity detectors 61, 62 and 63 into a logical signal position signals PS1, PS2 and PS3.

It should be readily apparent from the above description that according to this invention a commutatorless motor device is operated at a constant margin angle of commutation regardless of the load condition and the noise.

Although the invention has been described with respect to a preferred example, wherein the commutatorless motor is operated from a d.c. power source through an inverter, it is apparent that the invention is also applicable to a so-called a.c. type commutatorless motor utilizing a thyristor converter.

Obviously, numerous modifications and variations of the present invention are possible in light of the above teachings. It is therefore to be understood that within the scope of the appended claims, the invention may be practices otherwise than as specifically described herein.

What is claimed as new and desired to be secured by Letters Patent of the United States is:

1. A commutatorless motor device comprising:
   a frequency converter including controlled semiconductor switching elements;
   a synchronous motor driven by the frequency converter;
   phase voltage detecting means for detecting the phase voltage of the synchronous motor;
   speed detecting means for detecting the speed of the synchronous motor;
   a wave forming circuit for forming the waveform of the detected phase voltage by applying the output of the speed detecting means thereto, said wave forming circuit including an operational amplifier coupled to receive the detected phase voltage output of said phase voltage detecting means and a divider having two inputs, one of said two inputs being connected to the output of the operational amplifier and the other of said two inputs being connected to an output of the speed detecting means, said wave forming circuit producing an output voltage that is of constant amplitude regardless of the value of the phase voltage and regardless of the value of speed detected by the speed detecting means, said wave forming circuit operating such that phase lag is constant regardless of input frequency values;
   a logic signal converter for producing logic signals from the output of the wave forming circuit; and
   gate-pulse generating means responsive to said logic signals for producing signals for controlling the controlled semiconductor elements and for operating the commutatorless motor device at a constant margin angle of commutation regardless of load conditions and noise.

2. The commutatorless motor device recited in claim 1 including:
   a frequency-voltage converter connected between the speed detecting means and the wave forming circuit.

3. The commutatorless motor device recited in claim 1 wherein the logic signal converter includes:
   a polarity detector.

* * * * *